US008866038B2

(12) United States Patent
Lindsay et al.

(10) Patent No.: US 8,866,038 B2
(45) Date of Patent: Oct. 21, 2014

(54) CONSUMABLE COMPONENT PARTS FOR A PLASMA TORCH

(75) Inventors: Jon W. Lindsay, Hanover, NH (US); Brent R. Bartlett, Bradford, VT (US); Aaron D. Brandt, Grantham, NH (US); Zheng Duan, Hanover, NH (US); Stephen M. Liebold, Grantham, NH (US)

(73) Assignee: Hypertherm, Inc., Hanover, NH (US)

( * ) Notice: Subject to any disclaimer, the term of this patent is extended or adjusted under 35 U.S.C. 154(b) by 1428 days.

(21) Appl. No.: 11/626,191

(22) Filed: Jan. 23, 2007

(65) Prior Publication Data

US 2008/0173622 A1 Jul. 24, 2008

(51) Int. Cl.
*B23K 10/00* (2006.01)
*H05H 1/34* (2006.01)

(52) U.S. Cl.
CPC ......... *H05H 1/34* (2013.01); *H05H 2001/3478* (2013.01); *H05H 2001/3457* (2013.01)
USPC ............. 219/121.52; 219/121.48; 219/121.53

(58) Field of Classification Search
CPC ............ H05H 1/34; H05H 2001/3457; H05H 2001/3478
USPC ............... 219/121.48, 121.5, 121.51, 121.52, 219/121.59, 137.31, 74, 75, 121.49; 313/231.31, 231.41, 326; 315/111.21
See application file for complete search history.

(56) References Cited

U.S. PATENT DOCUMENTS

| | | | |
|---|---|---|---|
| 5,317,126 A | 5/1994 | Couch, Jr. et al. | |
| 5,841,095 A | 11/1998 | Lu et al. | |
| 6,156,995 A * | 12/2000 | Severance, Jr. | 219/121.5 |
| 6,320,156 B1 | 11/2001 | Yamaguchi et al. | |
| 6,424,082 B1 * | 7/2002 | Hackett et al. | 313/231.31 |
| 6,614,001 B2 | 9/2003 | Hackett et al. | |
| 6,979,796 B1 | 12/2005 | Hardwick | |
| 2004/0200810 A1 * | 10/2004 | Brandt et al. | 219/121.49 |
| 2005/0108736 A1 | 5/2005 | Schwabe et al. | 219/121.5 |

FOREIGN PATENT DOCUMENTS

| | | |
|---|---|---|
| GB | 2091594 | 8/1982 |
| JP | 2004314181 | 11/2004 |
| JP | 2005-329434 | 12/2005 |
| WO | 02/13583 | 2/2002 |

OTHER PUBLICATIONS

International Search Report and Written Opinion for International Application No. PCT/US2008/050692 dated May 26, 2008.

Notice of Opposition dated Sep. 15, 2011 filed in corresponding European Patent Application No. EP08250275.8 (EP1951007) titled "Consumable Component Parts for a Plasma Torch."

* cited by examiner

*Primary Examiner* — Jianying Atkisson
(74) *Attorney, Agent, or Firm* — Proskauer Rose LLP

(57) ABSTRACT

A component for a plasma arc torch includes a body portion, a tapered surface on the body portion, the tapered surface including a compressible member that provides a disengagement force relative to the body portion, and an axially disposed surface on the body portion for coupling a mating surface on an adjacent structure of the torch. The component can be a nozzle and/or an electrode.

17 Claims, 6 Drawing Sheets

CONSUMABLE COMPONENT PARTS FOR A PLASMA TORCH

BACKGROUND

Plasma arc torches are widely used in the cutting, welding, and heat treating of metallic materials. A plasma arc torch generally includes a cathode block with an electrode mounted therein, a nozzle with a central exit orifice mounted within a torch body, electrical connections, passages for cooling and arc control fluids, a swirl ring to control fluid flow patterns in the plasma chamber formed between the electrode and nozzle, and a power supply. Sustaining a plasma arc causes the electrode, nozzle, swirl ring, and shield to wear requiring routine replacement; as such, the component parts are known as “consumables”.

Gas cooled plasma cutting torches exist which allow the consumable component parts to be changed without requiring tools. However, these gas cooled torches commonly use the same fluid (e.g. air) to support the cutting process and to cool the torch. Because only a single gas is used in such torches, there is less of a need to segregate the different gases between the various torch components (through the use of seals, o-rings, and the like). As a result of generally looser alignment of the components, gas cooled torches tend to be generally easy to disassemble.

Liquid cooled torches, by comparison, require tight seals for segregating the different fluids/gases between the torch components. While these seals effectively control the fluid/gas flow between the different torch components, they also tend to hold the torch components tightly together. As a result, liquid cooled plasma cutting torches commonly require a specially designed tool to install and remove each consumable component part. For example, a specially designed tool is needed to install and remove the electrode, while another specially designed tool is needed to install and remove the nozzle, etc.

SUMMARY

Various factors facilitate the need for these specially designed tools. One factor includes the size of the consumable component part. For example, many consumable component parts have outside diameters less than 1 inch (2.54 cm) in size, making it difficult to generate enough torque to install and remove the consumable component parts by hand. Another factor includes precision alignment of the consumable component parts which requires small clearances between the mating diameters of the parts and the torch body. For example, part designs with tight radial clearances frequently do not freely mate with the torch body. Yet another factor includes incorporating seals, such as O-ring seals, in the consumable component part designs for containing and separating the liquid coolant and the process gases. Installing or removing consumable component parts with o-ring seals requires a force component to overcome the frictional drag force of the o-ring on the sealing surface.

These specially designed tools add cost to the system and complicate system usage. In addition, features must be added to the consumable component parts to interface with the tools adding to the overall cost of the parts.

Accordingly, a need exists to provide low-cost, readily-manufacturable, and easily-replaceable consumable components in a plasma arc torch, where the alignment and concentricity of the consumable components in the plasma arc torch can be closely controlled.

A component for a plasma arc torch includes a body portion, a tapered surface on the body portion, the tapered surface including a compressible member that provides a disengagement force relative to the body portion, and an axially disposed surface on the body portion for coupling to a mating surface on an adjacent structure of the torch. The component can be a nozzle and/or an electrode. The plasma arc torch can be liquid or gas cooled.

The compressible member can radially align the body portion with a central axis of the torch. The compressible member can provide a seal between the body portion and the torch. The compressible member can be an O-ring.

In one embodiment, the tapered surface on the body portion can have a clearance in the range of 0.00001 inches (0.000254 mm) to a value above zero with respect to a respective tapered surface of the torch. In another embodiment, the tapered surface may be touching at a point about the circumference of the body portion. The tapered surface can include a feature for receiving the compressible member, wherein the feature can be a recess defined by the body portion.

The axially disposed surface can be electrically coupled to the mating surface. The axially disposed surface can axially align the body portion in an axial position relative to the adjacent structure of the torch.

In another embodiment, a tool-free plasma torch includes a torch body, an electrode coupled to the torch body, a nozzle coupled to the torch body, the nozzle having a tapered surface including a compressible member that provides a disengagement force relative to an adjacent tapered surface of the torch body, and an axially disposed surface for coupling a mating surface on an adjacent structure of the torch body, and a retention cap coupled to the torch body to provide an engagement force for coupling the nozzle to the torch body. The electrode can further include a tapered surface including the compressible member for providing a disengagement force relative to an adjacent tapered surface of the torch body and an axially disposed surface for coupling a mating surface on an adjacent structure of the torch body.

The tool-free plasma torch can further include a spring element disposed between the electrode and the nozzle for providing a coupling force between the electrode and the torch body. The tool-free plasma torch can further include a swirl ring that includes a compressible member for providing a disengagement force relative to a tapered surface of the torch body. The spring element can be integrated with a swirl ring.

The compressible members can align at least one of the electrode, the nozzle, and the swirl ring with a central axis of the torch. The electrode and the swirl ring can be fixedly coupled to the torch body. The electrode and the nozzle can be electrically coupled to a cathode and an anode of the torch body, respectively. The shield can be hand tightened to the torch body.

In another embodiment, a plasma torch component can include a body portion, a tapered surface on the body portion dimensioned to receive a compressible member that provides a disengagement force relative to the body portion, an axially disposed surface on the body portion for aligning the body in an axial position relative to an adjacent structure of the torch and a mating surface for electrically coupling the component on the adjacent structure of the torch.

In another embodiment, a plasma torch component can include a body portion having an axial length and a radial width, an axial stop for aligning the body portion in the direction of the axial length, and a tapered surface on the body portion dimensioned to engage a compressible member, wherein when the component is assembled the compressible member creates a force having an axial direction and a radial direction, wherein the radial direction of the force aligns the component radially and the axial direction of the force biases the component in an unassembled direction.

In another embodiment, a plasma torch component can include a first component, an axial stop for rigidly aligning the first component in an axial direction relative to a second component, and a radial stop for flexibly aligning the first component in a radial direction relative to the second component and for biasing the first component in the axial direction. The first component can be a plasma torch body.

A method for aligning a first component in a plasma torch assembly, the first component having an axial stop and a tapered surface for engaging a compressible member, the method can include slidably engaging the axial stop of the first component to a second component of the plasma torch assembly to position the second component in an axial direction and biasing the compressible member against the tapered surface of the first component to radially align the first component to the second component.

In another embodiment, an assembly of plasma torch components can include a first component having an axial disposed surfaces and a tapered surface, a second component having an axial disposed surfaces, wherein the first component and the second component are aligned axially by their respective axial disposed surfaces, and a compression member aligning the first component and the second component radially, the compression member engaging the tapered surface such that the first component and the second component are biased in a direction of disassembly.

Advantages of the apparatus include high precision consumable component parts that are easily changeable without tools leading to reduce the overall system cost and ease of system usage.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
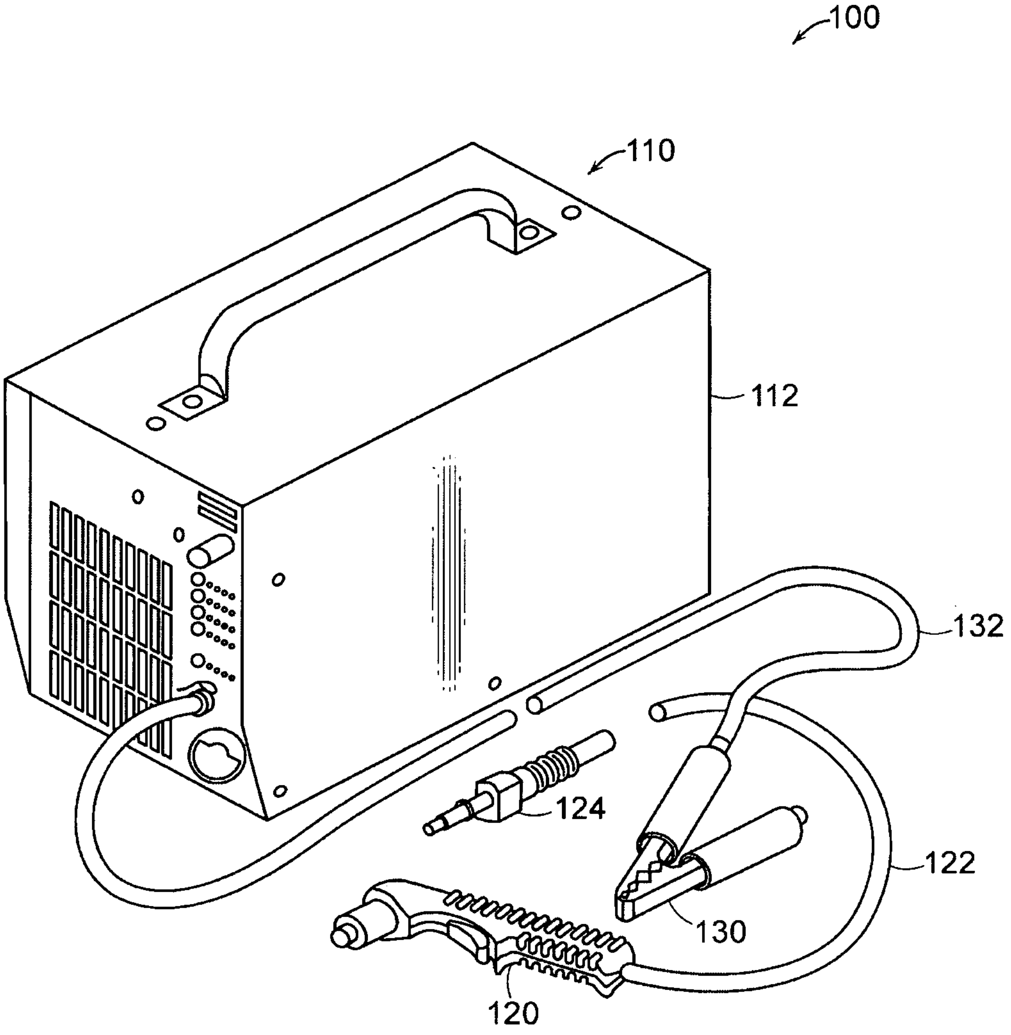
FIG. 1 illustrates a plasma arc torch system.

FIG. 1 illustrates a plasma arc torch system 100 representative of any of a variety of models of torch systems, including hand cutting and mechanized cutting systems. A power supply 110 provides continuously variable current output within a range (e.g. from about 20 to 40 amperes). This range can be lower or higher depending on the torch system, the thickness of the work piece and the desired cutting speeds. The variable power supply 110 allows for wide variations in cutting speeds for a given thickness of metal.

A torch body 120 configured for hand cutting is connected to the power supply 110 by a lead 122. The power supply 110 is enclosed by a housing 112. The lead 122 is connected to the power supply 110 by a strain relief system 124. The lead 122 provides the torch body 120 with a plasma gas from a gas source (not shown) and electrical power from the power supply 110 to ignite and sustain a plasma arc. In one embodiment, air is used as the plasma gas, but other gases can be used to improve cut quality on metals such as stainless steel and aluminum. A clamp 130 connects to a workpiece 250 (FIG. 2) through a workpiece lead 132 to provide a return path for the current generated by the power supply 110.

Figure 2:
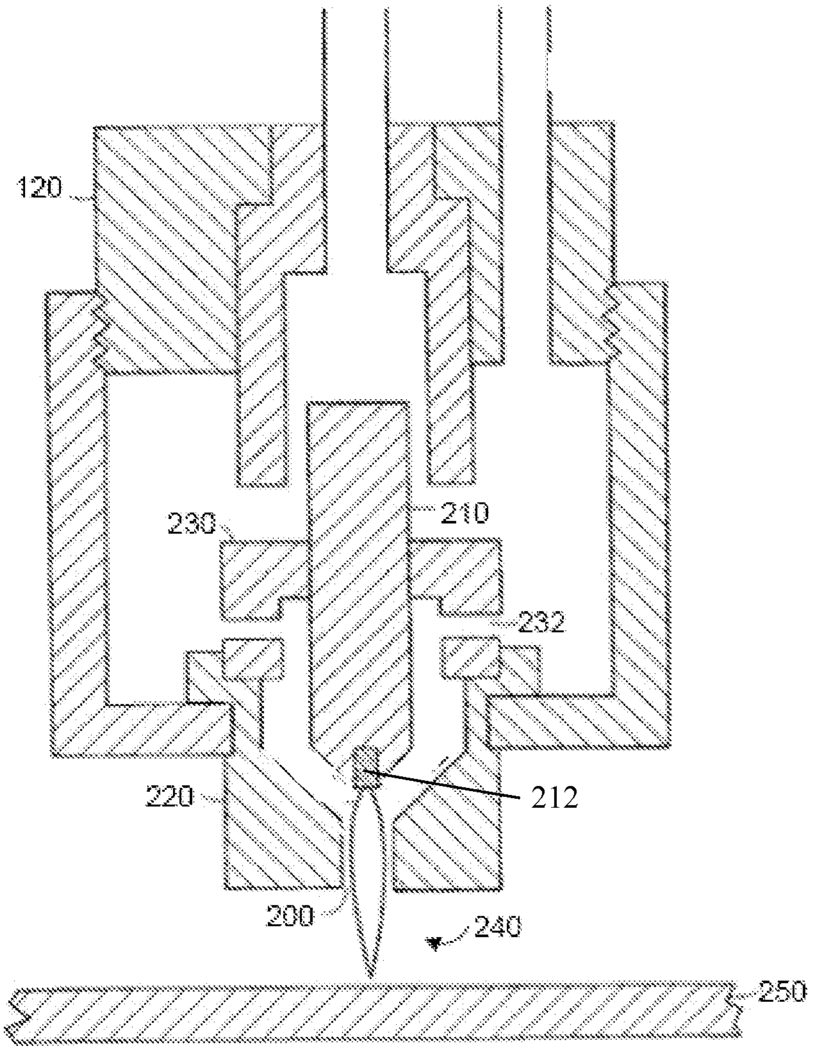
FIG. 2 illustrates in simplified schematic form a plasma arc torch.

FIG. 2 illustrates in simplified schematic form the plasma arc torch body of FIG. 1, representative of any of a variety of models of torches. The torch body 120 is generally cylindrical with an exit orifice 200 for allowing a plasma arc 240, i.e. an ionized gas jet, to be created between the torch body 120 and a workpiece 250. The torch is used to pierce and cut metal, such as mild steel or other electrically-conducting materials, in a transferred arc mode. The torch operates with a reactive gas, such as oxygen or air, or a non-reactive gas, such as nitrogen or argon, as the plasma gas to form the transferred plasma arc.

The torch body 120 supports an electrode 210 having an insert 212 in its lower end and a nozzle 220 spaced from the electrode 210. The nozzle 220 has a central orifice that defines the exit orifice 200. A swirl ring 230 is mounted to the torch body 120. In one embodiment, the swirl ring 230 has a set of radially offset (or canted) gas distribution holes 232 that impart a tangential velocity component to the plasma gas flow causing it to swirl. This swirl creates a vortex that constricts the arc and stabilizes the position of the arc on the insert.

Referring to FIGS. 3A-5, the assembly and disassembly of some of the torch components can be accomplished without the need for tools. For example, torch components that have typically included threads for engagement to adjacent components can be replaced by components that slidably engage the other plasma torch components through the structures described in greater detail below.

Figure 3A:
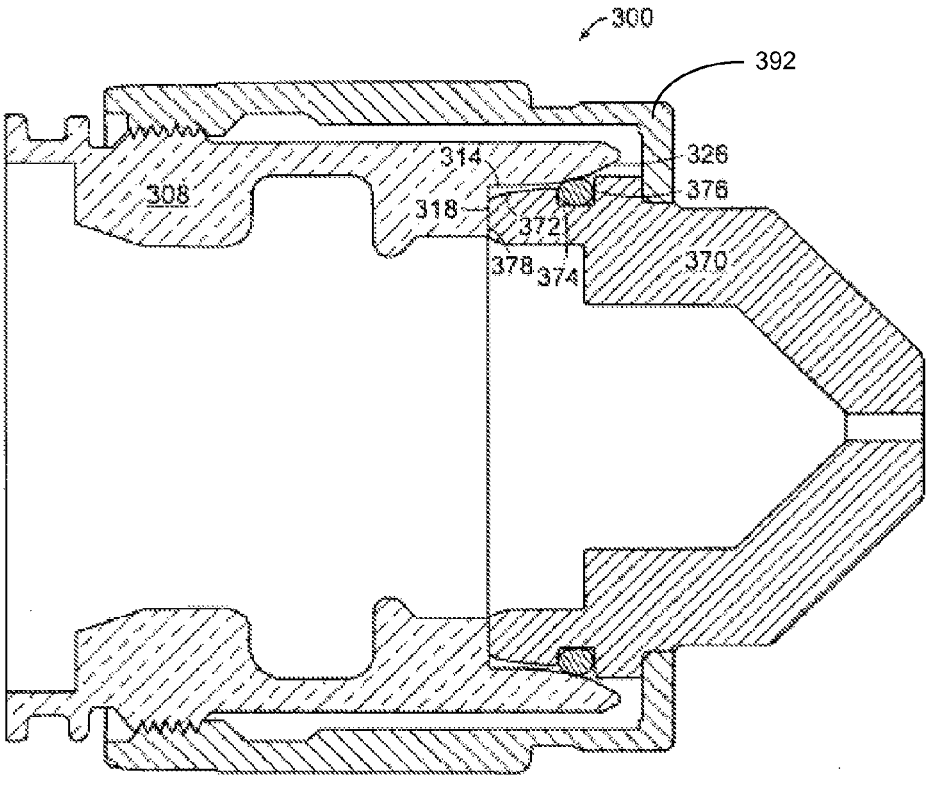
FIG. 3A is a simplified schematic diagram of a tool-free plasma arc torch.
Figure 3B:
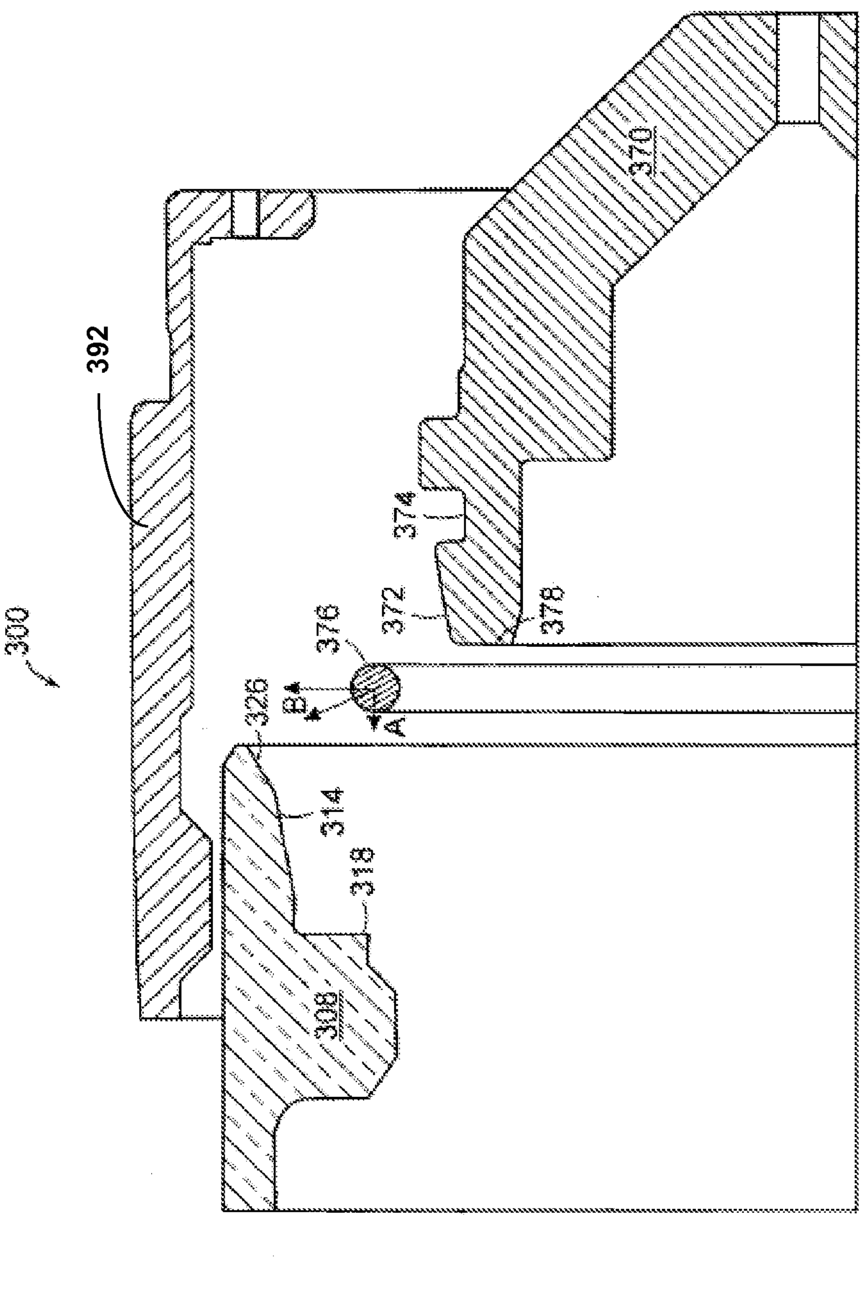
FIG. 3B is an exploded view of the schematic diagram of FIG. 3A.

FIGS. 3A and 3B show a simplified schematic and exploded diagram of a slidable nozzle 370 of a tool-free plasma arc torch 300. The slidable nozzle 370 is maintained in an assembled position through the use of a retention cap 392 that, when attached, holds the slidable nozzle to an anode block 308 of the torch body 300. Conversely, when the retention cap 392 is removed, the slidable nozzle 370 can be removed without the need for any tools.

Figure 4:
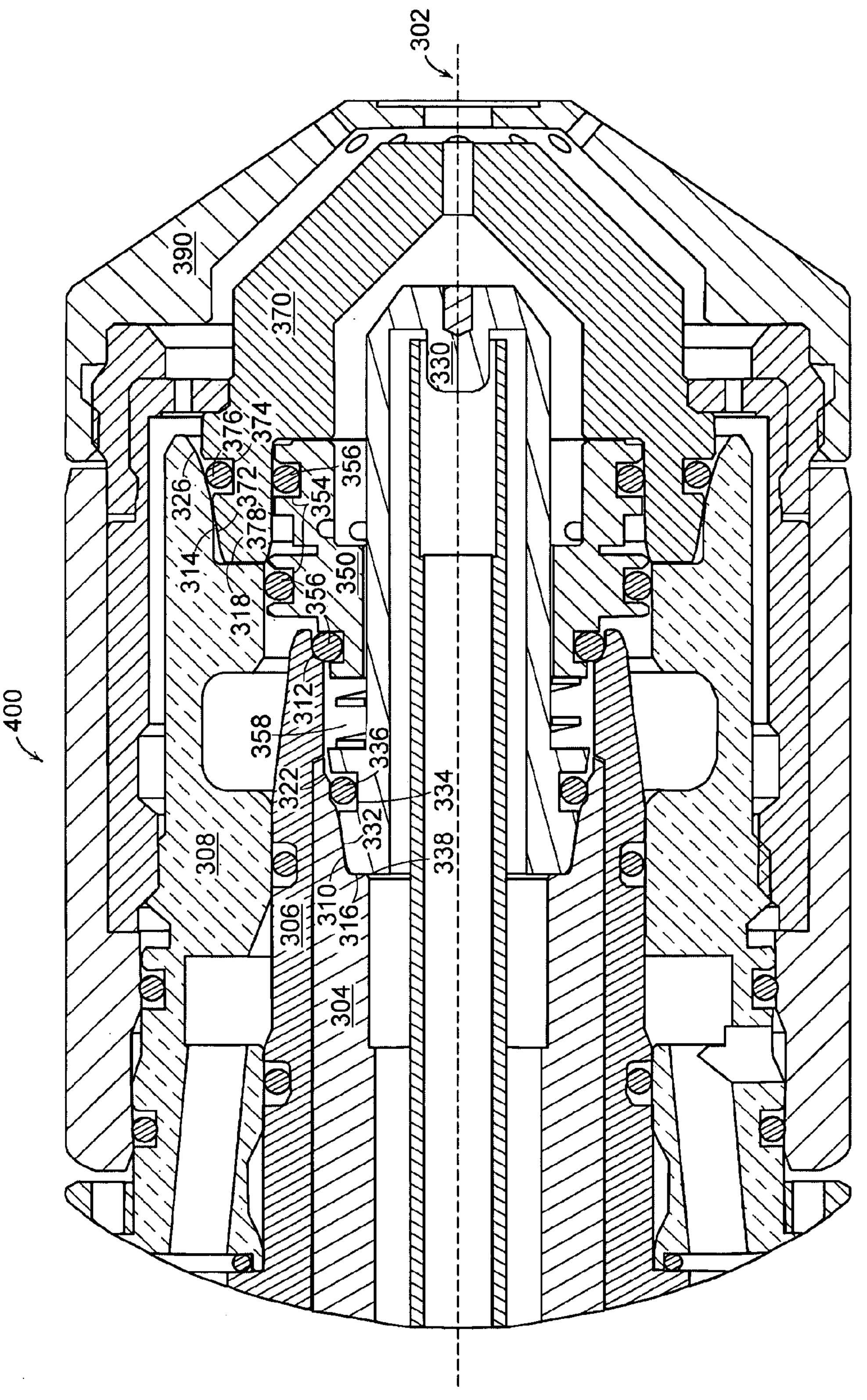
FIG. 4 is a schematic diagram of a tool-free plasma arc torch.

Moreover, a torch assembly, as shown in FIG. 4, can be created where a plurality of the torch components can be made to be slidably attached to the torch body, such that these components are coupled to the torch through the retention cap 392. Again, once the retaining cap 392 is removed the slidably components can be unassembled without the need for tools. Because these components can be slidably assembled, there is no need for threads to be included in these components in order to assemble to them to the torch body. Thus, both assembly time and manufacturing cost can be reduced.

As shown in FIGS. 3A and 3B, at least two torch components of a torch body are slidably coupled together such that in an assembled configuration, the two torch components (e.g., an anode 308 and a nozzle 370) are aligned in both a longitudinal direction and radial direction. The two torch components (308, 370) are also biased in an unassembled direction. The combination of alignment and biasing can be achieved by a number of embodiments and configuration, including the configuration described immediately below.

As shown, the first torch component (308) and a second torch component (370) are aligned by a primary datum and a secondary datum with a compressible member (376) disposed between the two components (308, 370). The primary datum is an axial stop (318) in the first component (308), such that when assembled, the primary datum of the first component (308) abuts a corresponding feature or axial stop (378) in the second component (370). The axial stop may be a lip or edge in the first component (308) that engages a similar lip or edge in the second component (370) to establish the relative position of the two components along a longitudinal axis. The axial stop may be a hard or rigid axial stop such as created by a metal-to-metal contact.

The secondary datum may be established by a tapered surface (314) in the first component (308) that aligns the first component (308) and the second component (370) in the radial direction through the compressible member (376). In one embodiment, the compressible member (376) sits on the tapered surface (314) of the first component (308) and, when assembled, is compressed between the first component (308) and the second component (370). During compression of the compression member (376), a compression vector is created having both an axial component (A) and a radial component (B).

The radial component (B) serves to align the first component (308) and the second component (370) radially. The axial component (A) serves to bias the first component (308) and the second component (370) in an unassembled direction such that the two components (308, 370) freely disengage when the torch body (300) is being disassembled. The compression of the compressible member may also serve as a fluid seal between the first component (308) and second component (370). Because the secondary datum is positioned at the location of the contact of the compressible member, the secondary datum may be flexible. It should also be noted that the secondary datum may still allow for contact at a single point between the first component (308) and the second component (370) and still perform the aligning and biasing functions. Through the use of two datums, the first component (308) and the second component (370) are aligned in a manner that allows for ready disengagement and assembly.

FIG. 4 shows an embodiment of a lower body portion, or "working end" 400 of a liquid or gas cooled-type plasma arc torch as shown in FIGS. 1 and 2. The working end 400 has a centrally disposed longitudinal axis 302 and includes a cathode block 304, a torch insulator 306, and an anode block 308, each block having respective tapered alignment surfaces 310, 312, 314. The cathode block 304 and the anode block 308 include respective axial stops 316, 318. In some embodiments, the tapered alignment surface 308, 314 of the cathode block 304 and the anode block 308 can include respective lead-ins 322, 326 for protecting consumable components from damage during installation. Further, the lead-ins 322, 326 are beneficial for component ejection by increasing axial force and reducing drag force on the components. The working end 400 further includes radially centered consumable components (an electrode 330, a swirl ring 350, a nozzle 370, and a shield 390). In some embodiments, each tapered alignment surface 308, 312, 314 can further include a compressible member (not shown) for providing a seal, a radial alignment force, and an axial disengagement force between the torch and the consumable components. In some embodiments, the torch is liquid or gas cooled.

The electrode 330 includes a tapered surface 332 for aligning with the first tapered alignment surface 310 of the working end 400 of the plasma arc torch. The tapered surface 322 includes a feature (e.g. a recess) 334 or is dimensioned to receive a compressible member 336. The compressible member 336, such as an O-ring, provides the following functions: 1) a seal between the electrode 330 and the plasma chamber to contain and separate process gases and torch coolant; 2) a radial stop creating a radial alignment force for flexibly aligning the electrode 330 in the radial direction; and 3) an axial disengagement force between the working end 400 and the electrode 330 for biasing the electrode 330 in an unassembled direction. In some embodiments, the tapered surface 332 has an axial extent of less than about 0.5 inches (1.27 cm) and, in some embodiments, less than about 0.25 inches (0.635 cm). The electrode 330 further includes an axial stop 338 for aligning the electrode 330 with the axial stop 316 of the cathode block 304. In some embodiments, the axial stops 316, 338 are rigidly coupled. Further, axial-to-axial stop 316, 338 allows for conduction of electrical current and thermal energy needed to operate the torch. It should be understood that electrically coupling of the electrode 330 to the cathode block 304 can be accomplished in other manner known in the art.

During installation, as the electrode 330 is installed in the working end 400 of the plasma arc torch, the tapered surface 332 is guided by the first tapered alignment surface 310 until the compressible member 336 comes to rest against first tapered alignment surface 310. The lead-in 322 on the first tapered alignment surface 310 prevents the compressible member or O-ring 336 from being damaged. As shown, in one embodiment a nominal clearance of 0.002 inches is provided between the taper surface 332 and the first tapered alignment surface 310 to prevent binding during installation.

In some embodiments, a swirl ring 350 can be disposed between the electrode 330 and the nozzle 370. The swirl ring 350 controls the fluid flow patterns on the plasma chamber front between the electrode 330 and the nozzle 370. The swirl ring 350 includes at least one feature (e.g. a recess) 354 or is dimensioned to receive a respective compressible member 356 for aligning with the second tapered alignment surface 312 of the working end 400 of the plasma arc torch. The compressible member 356, such as an O-ring, provides the following functions: 1) a seal between the swirl ring 350 and the plasma chamber to contain and separate process gases and torch coolant; 2) a radial stop creating a radial alignment force for flexibly aligning the swirl ring 350 in the radial direction; and 3) an axial disengagement force between the working end 400 and the swirl ring 350 for biasing the swirl ring 350 in an unassembled direction. In some embodiments, a spring element 358 is disposed between the electrode 330 and the swirl ring 350 to provide an engagement force of the electrode 330 and the cathode block 304 during installation. It should be understood that the spring element 358 can be disposed between the swirl ring 350 and the nozzle 370, integrated with the swirl ring 350, or provided in any configuration that provides engagement force of the electrode 330 to the cathode block 304.

During installation, as the swirl ring 350 is installed in the working end 400 of the plasma arc torch, the compressible member 356 comes to rest against second tapered alignment surface 312. It should be understood a non-integrated spring element 358 can be installed before or after the installation of the swirl ring 350 or in replacement of the swirl ring 350.

The nozzle 370 includes a tapered surface 372 for aligning with the third tapered alignment surface 314 of the working end 400 of the plasma arc torch. The tapered surface 372 includes a feature (e.g. a recess) 374 or is dimensioned to receive a compressible member 376. The compressible member 376, such as an O-ring, provides the following functions:

1) a seal between the nozzle 370 and the plasma chamber to contain and separate process gases and torch coolant; 2) a radial stop creating a radial alignment force for flexibly aligning the nozzle 370 in the radial direction; and 3) an axial disengagement force between the working end 400 and the nozzle 370 for biasing the nozzle 370 in an unassembled direction. In some embodiments, the tapered surface 372 has an axial extent of less than about 0.5 inches (1.27 cm). The nozzle 370 further includes an axial stop 378 for aligning the nozzle 370 with the axial stop 318 of the anode block 308. In some embodiments, the axial stops 318, 378 are rigidly coupled. Further, axial-to-axial stop 318, 378 allows for conduction of electrical current and thermal energy needed to operate the torch. It should be understood that electrically coupling of the nozzle 370 to the anode block 308 can be accomplished in other manner known in the art.

During installation, as the nozzle 370 is installed in the working end 400 of the plasma arc torch, the tapered surface 372 is guided by the third tapered alignment surface 314 until the compressible member 376 comes to rest against third tapered alignment surface 314. The lead-in 326 on the third tapered alignment surface 314 prevents the compressible member or O-ring 376 from being damaged. As shown, in one embodiment a nominal clearance of 0.002 inches is provided between the taper surface 372 and the third tapered alignment surface 314 to prevent binding during installation.

A hand-threaded retaining cap 392 may be employed to couple the consumables components to the torch body. The retaining cap 392 causes a force to be placed on the nozzle 370, the swirl ring 350, and the electrode 330 (through the spring element 358) that causes the longitudinal axis of these components to align with the torch axis 302. The force further seats these components with their respective counterparts of the working end 400 of the torch (e.g. the cathode block 304, the torch insulator 306, and the anode block 308).

The shield 390 is typically the outermost component of the working end 400 of the torch. In some embodiments, the shield 390 may be threadedly attached to the torch working end 400 or attached in a press-on configuration. In other embodiments, shield 390 may be connected to the torch body by retain cap 392. In such embodiments, the shield 390 may likewise include a tapered surface 372 for aligning with adjacent components. The tapered surface 372 may also include a feature (e.g. a recess) 374 to receive a compressible member 356. In some embodiments, the shield 390 may serve to function as the retaining cap thereby providing the necessary force to seat the consumable components.

During torch operation, the electrode 330, the swirl ring 350, the nozzle 370, and the shield 390 are subjected to harsh conditions, including high temperatures and other physical stresses. Consequently, these components degrade over time and eventually must be replaced, typically in the field. Prior techniques required the use of specialized tools to remove these components. In the above embodiment, the retaining cap 392 need only be removed by hand thereby allowing the axial component of the compression force on compressible members to assist in ejecting these components from the torch.

FIG. 4 demonstrates an embodiment incorporating both tool-free and conventional torch components. That is, some components may be conventional type threaded consumables and some components may be slidable as described above. This allows for a reduction cost for the components that are more likely to be replaced than others. That is, the consumable components closest to the plasma arc are more likely to wear and need replacement before the components further from the plasma arc. For example, the electrode 330 and the nozzle 370 are more likely to wear before the shield 390, and the shield 390 is more likely to wear before the swirl ring 350, etc.

In the embodiment, the electrode 330 is threadedly attached to the cathode block 304 eliminating the need for the spring element 358 (FIG. 3). The swirl ring 350, the nozzle 370, and the shield 390 are each coupled to the "working end" 400 of the plasma arc torch as mentioned above.

Figure 5:
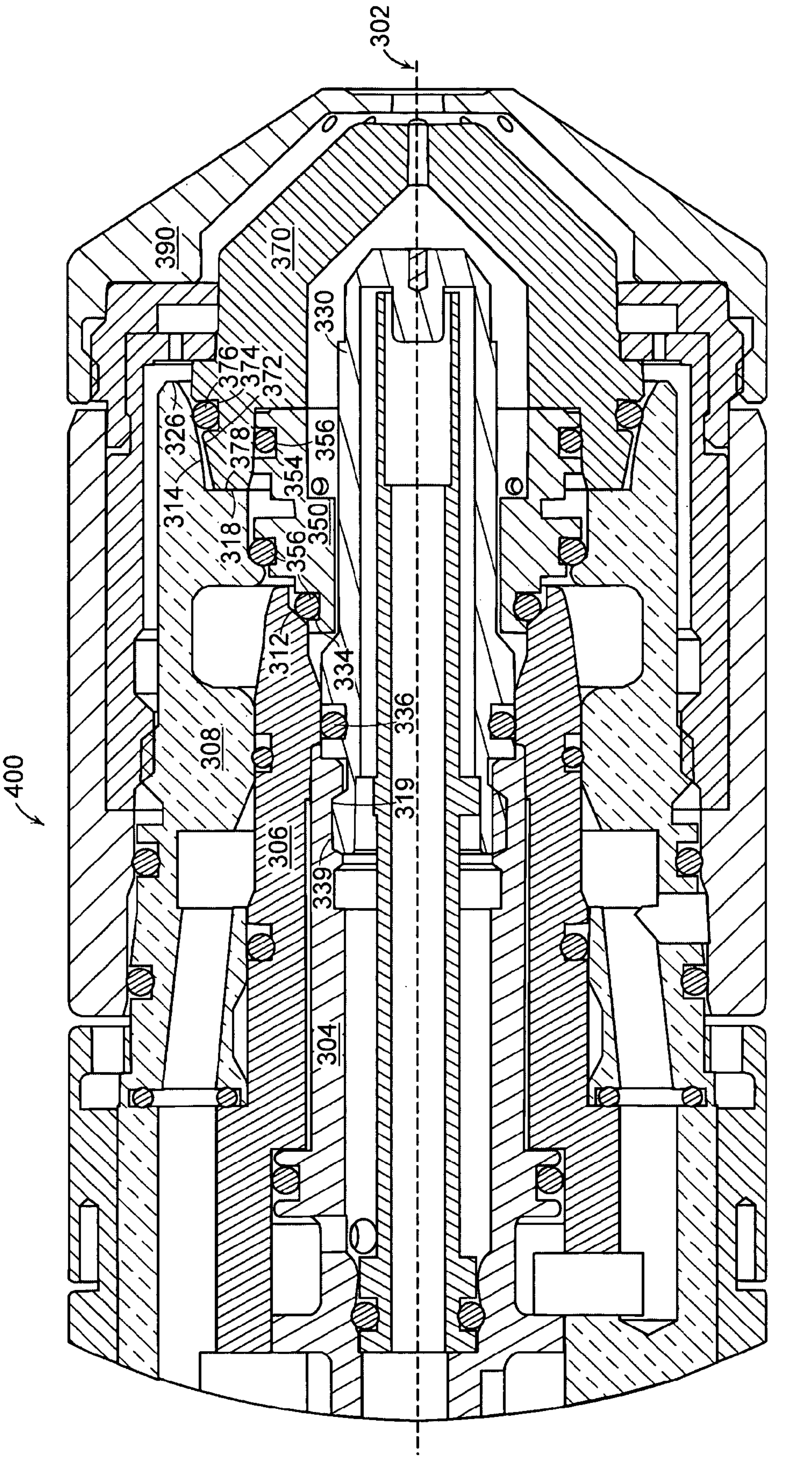
FIG. 5 is a schematic diagram of another embodiment of the tool-free plasma arc torch of FIG. 4.

The electrode 330 of FIG. 5 includes a threaded surface 339 and a deformable surface, such as a lip. The threaded surface 339 engages a cooperating thread 319 of the cathode block 304. By threadedly attaching the electrode 330 to the cathode block 304, the electrode 304 is axially aligned with the torch axis 302 and properly spaced from the nozzle 350 during torch operation. The engagement of the threaded surface 339 with the cooperating thread 319 also serves as an electrical connection to conduct the requisite current between the cathode block 304 and the electrode 330.

In some embodiments, the swirl ring 350 may also include a threaded surface that engages a cooperating threaded surface on the torch insulator 306. In general, however, the swirl ring 350 is simply captured in the working end 400 of the torch by the retention cap. In either configuration, it is desirable to center the swirl ring 350 about the electrode 330 so as to provide a concentric uniform annular plasma chamber to provide uniform gas flow therein and facilitate torch operation.

FIGS. 3 and 4 show each tapered surface as a linear taper surface, however it should be understood that each tapered surface can be any number of shapes, including contoured surfaces and arcs. In general, the shape of the "tapered" surface can be understood to be any shape such that when two torch components are assembled, the tangent to the surface at the point of contact with compressible member is angled in the unassembled direction relative to the torch axis.

From the foregoing, it will be appreciated that the working end provides a simple and effective way to ensure the proper alignment of consumable components in the working end of a plasma arc torch. The problems of securing the critical alignments while operating under harsh field conditions, compounded by the need to replace components as they deteriorate from use, are largely eliminated. This avoids the unacceptable production errors affecting workpieces caused by improperly aligned apparatus and facilitates quick and easy replacement of the consumable components.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for engagement of a replaceable consumable component with a first component in a plasma arc torch, the replaceable consumable component and the first component being maintained in the plasma torch by a retaining cap, the first component having a tapered surface and an axially disposed surface on a body portion of the first component, the method comprising:

providing a compressible member, wherein the tapered surface on the body portion of the first component is dimensioned to engage the compressible member;

slideably engaging the first component with the replaceable consumable component, the replaceable consumable component including a body and a mating surface for engaging the axially disposed surface of the first component, the compressible member disposed between the tapered surface of the first component and a second surface of the replaceable consumable component; and biasing the compressible member between the tapered surface of the first component and the second surface of the replaceable consumable component to establish a disengagement force relative to the body portion of the first component such that, after the retaining cap is removed, the replaceable consumable component freely disengages from the plasma arc torch without the use of tools after an operation of the torch.

2. The method of claim 1, wherein the replaceable consumable component is one of a nozzle, a shield, a swirl ring, an electrode, or a portion of a body of the plasma arc torch.

3. The method of claim 1, wherein the compressible member radially aligns the body portion with a central axis of the torch.

4. The method of claim 1, wherein the tapered surface on the body portion has a clearance in the range of 0.00001 to 0.002 inches (0.000254 to 0.0508 mm) with respect to the surface of the replaceable consumable component.

5. The method of claim 1, wherein the compressible member provides a seal between the body portion and the replaceable consumable component.

6. The method of claim 1, wherein the compressible member is an O-ring.

7. The method of claim 1, wherein the tapered surface includes a feature for receiving the compressible member.

8. The method of claim 7, wherein the feature on the tapered surface is a recess defined by the body portion.

9. The method of claim 1, wherein the axially disposed surface of the first component and the mating surface of the replaceable consumable component are electrically coupled.

10. The method of claim 1, wherein the axially disposed surface axially aligns the body portion in an axial position relative to the mating surface of the replaceable consumable component.

11. A method for aligning a first component in a plasma torch assembly, the first component having an axial stop and a tapered surface for engaging a compressible member, the first component being maintained in the plasma torch assembly by a retaining cap, the method comprising:

slideably engaging the axial stop of the first component to a second component of the plasma torch assembly to position the second component relative to the first component in an axial direction; and biasing the compressible member against the tapered surface of the first component to radially align the first component to the second component, wherein the components are dimensioned such that, after the retaining cap is removed, the components freely disengage, without the use of tools, after an operation of the plasma torch assembly.

12. A method for aligning a first component and a second component of a plasma torch assembly, having a compressible member disposed between the two components and a retaining cap for maintaining the first and second components in the plasma torch assembly, the method comprising:

axially aligning the first component to the second component by a rigid primary datum;

radially aligning the first component to the second component by a flexible secondary datum, such that the compressible member radially aligns the first component and the second component and axially biases the first component in an unassembled direction relative to the second component, the first component dimensioned such that the bias in the unassembled direction enables the first component to freely disengage from the plasma torch assembly, after the retaining cap is removed, without the use of tools, after an operation of the plasma torch assembly.

13. The method of claim 1 wherein the biasing of the compressible member establishes a compression vector having both an axial component and a radial component, the radial component of the compression vector configured to radially align the consumable component within the body of the torch, and the axial component of the compression vector configured to provide the disengagement force.

14. The method of claim 12 wherein the bias in the unassembled direction enables the first component to freely disengage relative to the second component, after the retaining cap is removed, without the use of tools following an operation of the plasma torch assembly.

15. A method for engagement of a replaceable consumable component within a plasma arc torch having a first component and a retaining cap, the first component having a tapered surface and an axially disposed surface, the retaining cap coupling the replaceable consumable component and the first component within the plasma torch, the method comprising:

providing a compressible member that, when biased, provides an axial disengagement force, wherein the tapered surface on the first component is dimensioned to engage the compressible member;

slideably engaging the first component with the replaceable consumable component, wherein the compressible member is disposed between the tapered surface of the first component and a surface of the replaceable consumable component; and biasing the compressible member between the tapered surface of the first component and the surface of the replaceable consumable component to establish the axial disengagement force relative to the replaceable consumable component such that, when the retaining cap is removed, the axial disengagement force causes the replaceable consumable component to freely disengage from the plasma arc torch without the use of tools.

16. The method of claim 15 further comprising providing a compressible member that, when biased, provides a radial disengagement force that serves to align the replaceable consumable component and the first component radially.

17. The method of claim 15 wherein the replaceable consumable component is one of a nozzle, a shield, a swirl ring, an electrode, or a portion of a body of the plasma arc torch.

* * * * *